United States Patent
Nakamura

(10) Patent No.: US 6,466,261 B1
(45) Date of Patent: Oct. 15, 2002

(54) DOOR CAMERA UNIT HAVING A VIDEO MEMORY

(75) Inventor: Hiroshi Nakamura, Tokyo (JP)

(73) Assignee: Niles Parts Co., Ltd., Tokyo (JP)

(*) Notice: Subject to any disclaimer, the term of this patent is extended or adjusted under 35 U.S.C. 154(b) by 0 days.

(21) Appl. No.: 09/044,832

(22) Filed: Mar. 20, 1998

(30) Foreign Application Priority Data

May 15, 1997 (JP) .............................................. 9-141024

(51) Int. Cl.[7] .................................................. H04N 7/18
(52) U.S. Cl. .................................................... 348/151
(58) Field of Search ................................. 348/143–172, 348/715; 340/555; 382/2, 8; 367/93; 360/5; 386/112; H04N 7/18

(56) References Cited

U.S. PATENT DOCUMENTS

| | | | | |
|---|---|---|---|---|
| 4,524,384 A | * | 6/1985 | Leftkowitz | 348/156 |
| 4,972,494 A | * | 11/1990 | White et al. | 382/8 |
| 5,001,557 A | * | 3/1991 | Begle | 358/113 |
| 5,155,474 A | * | 10/1992 | Park et al. | 340/691 |
| 5,163,094 A | * | 11/1992 | Prokoski et al. | 382/2 |
| 5,428,388 A | * | 6/1995 | von Bauer et al. | 348/155 |
| 5,455,625 A | * | 10/1995 | Englander | 348/375 |
| 5,541,585 A | * | 7/1996 | Duhame et al. | 340/825.69 |
| 5,541,639 A | * | 7/1996 | Takasuki et al. | 348/15.1 |
| 5,706,388 A | * | 1/1998 | Isaka | 386/125 |
| 5,712,830 A | * | 1/1998 | Ross et al. | 367/93 |
| 5,717,379 A | * | 2/1998 | Peters | 340/529 |
| 5,748,081 A | * | 5/1998 | Lin | 340/555 |
| 5,903,321 A | * | 5/1999 | Tung et al. | 348/715 |
| 5,907,352 A | * | 5/1999 | Gilley | 348/151 |
| 5,915,069 A | * | 6/1999 | Nishijima | 386/112 |
| 5,926,209 A | * | 7/1999 | Glatt | 348/143 |
| 5,973,867 A | * | 10/1999 | Yamamoto | 360/5 |
| 5,995,139 A | * | 11/1999 | Lee | 348/143 |

FOREIGN PATENT DOCUMENTS

JP      HEI5-308638      11/1993

* cited by examiner

Primary Examiner—Chris Kelley
Assistant Examiner—Tung Vo
(74) Attorney, Agent, or Firm—Rader Fishman & Grauer

(57) ABSTRACT

A door camera unit with a video memory is provided. The camera unit is set so that its imaging direction is directed to a neighborhood of an entrance of a building. The camera unit is configured so that only necessary video images are recorded. When a visitor operates a chime switch, video images are recorded in memory. Video images are also recorded in memory when a human body is detected but the chime switch is not operated within a predetermined period of time.

2 Claims, 2 Drawing Sheets

DOOR CAMERA UNIT HAVING A VIDEO MEMORY

FIELD OF THE INVENTION

The present invention relates to an improvement of a door camera unit for imaging visitors, for example, set so as to direct an imaging direction to a neighborhood of an entrance of a building.

DESCRIPTION OF THE PRIOR ART

As to this kind of prior art techniques, there are known television interphones such as the one disclosed in JP-A-Hei 5-308638. By these prior art techniques, visitors, for example, are imaged by means of a television camera whose video signals are taken in by a television monitor to be displayed. The whole device is so constructed that there are disposed A/D converting means, a video memory, signal processing means and D/A converting means on signal lines connecting the television monitor with the television camera; that the video signals from the television camera are converted into digital data by means of the A/D converting means and digital video data are stored temporarily in the video memory, that thereafter they are subjected to video distortion correction by means of the signal processing means and enlarging processing and converted again to analogue signals by means of the D/A converting means; and finally they are inputted to the television monitor.

However, the video memory according to the prior art is a device for storing strictly temporarily video data in order to subject them to video distortion correction, enlarging processing, etc. and it is not constructed for recording or conservation of the video data. For this reason, according to the prior art techniques, it was not possible to image doubtful visitors, etc. and leave video image's thereof for the sake of security, i.e. safety. In a general security system, video images are recorded by means of a video recorder. In cases where they are recorded by means of a video recorder, unnecessary video images are also recorded, requiring not only a lot of time searching a necessary video image, but also makes it impossible to assemble the door camera unit and the recording means in one body in a compact manner.

SUMMARY OF THE INVENTION

The present invention has been made in order to solve the above problem and an object thereof is to provide a door camera unit having recording means, which includes a video memory, in which only necessary video images are automatically recorded.

In order to solve the above problem of the prior art, according to the present invention, a door camera unit whose imaging direction is directed to a neighborhood of an entrance of a building, has a video memory in which an information inputting section is connected with the door camera unit, the section of which outputs information signals for judging whether video images should be recorded or not. The video memory for recording records every time an information signal inputted from the information inputting section to the door camera unit meets video image recording execution conditions.

In the invention described above, the information inputting section may include a chime switch operated by a visitor and a video image may be recorded in the video memory every time an operation signal inputted from the information inputting section to the door camera unit meets video image recording execution conditions.

In the invention described above, the information inputting section may include a chime switch operated by a visitor and a human body detecting sensor detecting access of the visitor, an image of whom may be recorded in the video memory unless an operation signal is inputted from the chime switch in a predetermined period of time after a detection signal has been inputted from the human body detecting sensor.

DESCRIPTION OF THE PREFERRED EMBODIMENTS

Figure 1:
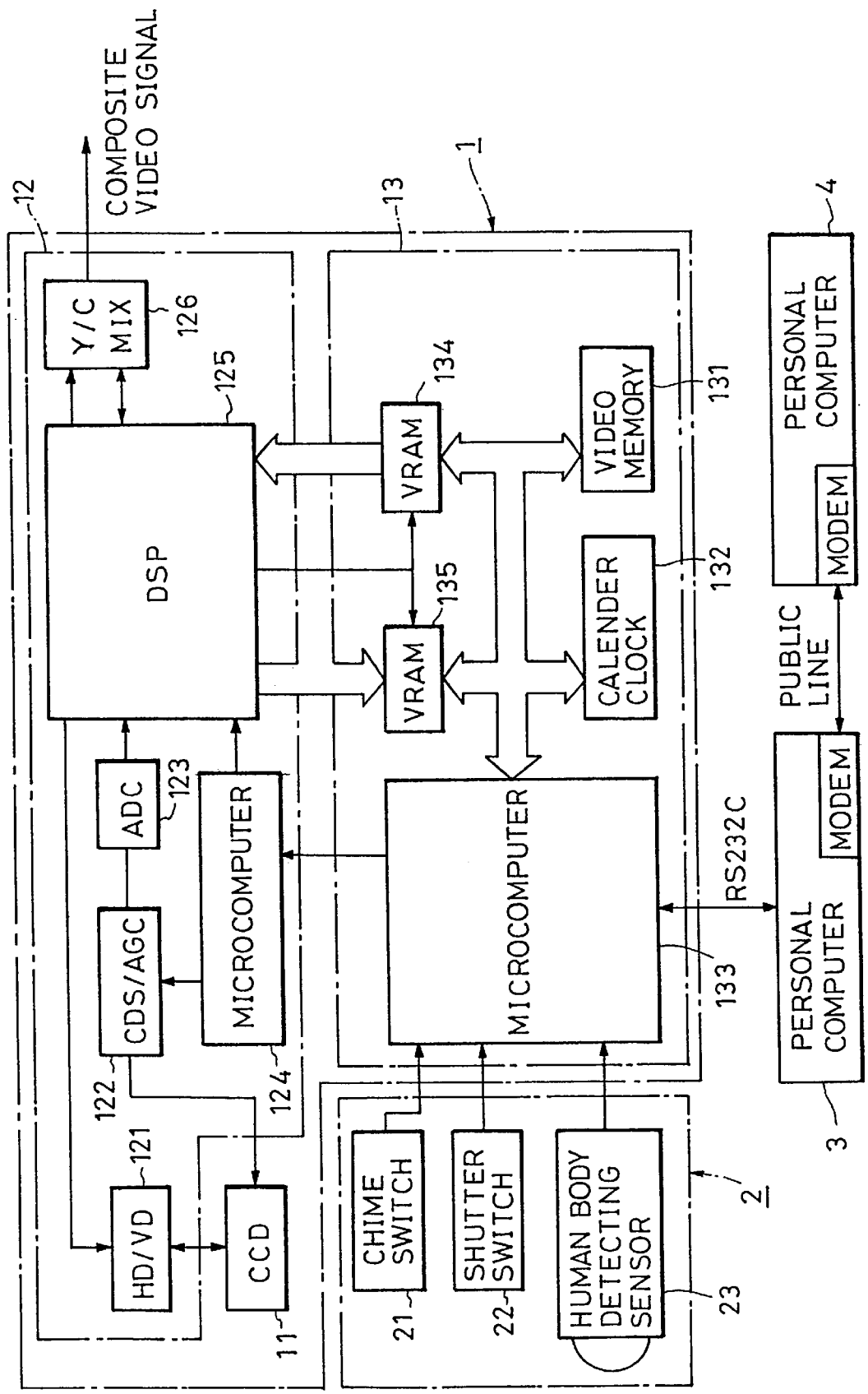
FIG. 1 is an electric block diagram showing an embodiment of the present invention.

Hereinbelow an embodiment of the present invention will be explained, referring to FIG. 1, in which reference numeral 1 is a door camera unit; 2 is an information inputting section; 3 and 4 are personal computers.

At first the door camera unit 1 will be explained. The door camera unit 1 is one incorporating a CCD (Charge Coupled Device) camera section 11, an image processing section 12, and a memory processing section 13. The CCD camera section 11 is set so that its imaging direction is directed to a neighborhood of an entrance of a building.

The image processing section 12 is one which processes video signals outputted by the CCD camera section 11 and is composed of a HD/VD (Horizontal Drive/Vertical Drive) circuit 121, a CDS/AGC (Correlated Double Sampling/Auto Gain Control) circuit 122, an ADC (Analogue Digital Converter) circuit 123, a microcomputer circuit 124, a DSP (Digital Signal Processor) circuit 125, and a Y/C (Luminance/Chrominance) Mix circuit 126.

The HD/VD circuit 121 inputs horizontal synchronizing signals and vertical synchronizing signals to the CCD camera section 11. The CDS/AGC circuit 122 takes out a smoothly varying continuous signal from signals outputted by the CCD camera section 11 to effect gain regulation and forms brightness (Y) signals and color (R,G,B) signals to output them, while outputting diaphragm regulating signals for the CCD camera section 11. Speaking more in detail, the CCD camera section 11 outputs alternately a noise component and a signal component superposed thereon, which causes worsening the S/N (Signal/Noise) ratio. The CDS/AGC circuit 122 cramps noise components among signals outputted by the CCD camera section 11 at a predetermined voltage to remove low frequency noises and at the same time forms a continuous signal from which noise components are removed by sample-holding signal components.

Further the ADC circuit 123 converts analogue video signals outputted by the CDS/AGC circuit 122 into digital video signals. The microcomputer circuit 124, such as an 8-bit microcomputer for example, is adapted to control the CDS/AGC circuit 122, the DSP circuit 125, etc. The DSP circuit 125 processes brightness (Y) signals, color (R,G,B) signals, white balance signals, etc. of the video signals in a digital manner. The Y/C Mix circuit 126 is one for mixing the luminance (Y) signals and chrominance (C) signals.

Now the memory processing section 13 will be explained. This memory processing section 13 is connected to the information inputting section 2 to store images, depending on the information signal inputted from the information inputting section 2. Memory processing section 13 is composed of a video memory 131, a calendar clock 132, a microcomputer 133 and VRAM 134, 135.

The video memory 131 reads video data of one frame from the image processing section 12 to store them for every access from the microcomputer 133 and for which, e.g. flash memory elements are adopted to construct a large capacity type non-volatile memory having a memory capacity of about 1 M×16 bits. It is preferable to delete oldest video data, e.g. every time new video data should be recorded, in case the video memory 131 is full of recorded data. The calendar clock 132 generates data as to the date and the time when the video data is recorded in the video memory 131. For example, that superimposes these data and time on the video data recorded in the video memory 131.

Further the microcomputer circuit 133 controls the video memory 131, the calendar clock 132 and the VRAM (Video Random Access Memory) 134, 135, for which e.g. a 32-bit RISC microcomputer, etc. are adopted. The VRAM 134 and 135 stores temporarily these video data when the video data are read in from the video processing section 12 or when the video data recorded in the video memory 131 are read out to the video processing section 12, for each of which a VRAM, having a memory capacity of about 256K×16 bits is adopted.

Next the information inputting section 2 will be explained. The information inputting section 2 outputs information signals used by the microcomputer 133 in the memory processing section 13 for judging whether the video signal should be recorded or not. The information inputting section 2 further has a chime switch 21 operated by a visitor, a human body detecting sensor 23 for detecting access of the visitor, and a shutter switch 22, which an operator can operate while observing the television monitor in a room.

Now an operation mode thereof will be explained. The microcomputer 133 in the memory processing section 13 is set so as to execute at least either one of a first mode, in which a video signal of one frame is recorded in the video memory 131, every time an operation signal is inputted from the chime switch 21 in the information inputting section 2, and a second mode, in which a video signal of one frame is recorded in the video memory 131, unless an operation signal is inputted from the chime switch 21 in a predetermined period of time after a detection signal has been inputted from the human body detecting sensor 23.

For example, when the human body detecting sensor 23 outputs a detection signal due to the fact that the visitor approaches the neighborhood of the entrance of the building, the microcomputer 133 begins a timer operation upon receiving this detection signal. When the visitor pushes the chime in the predetermined period of time thereafter, an operation signal is inputted from the chime switch 21 to the microcomputer 133. When the microcomputer 133 receives the operation signal, it controls the image processing section 12, reads in video data of one frame from the image processing section 12 into the VRAM 134, and further records them in the video memory 131 together with the data on the date and time generated by the calendar clock 132. That is, it executes the first mode.

In cases where the visitor does not push the chime in the predetermined period of time after start of the timer operation, the microcomputer 133 regards the visitor as doubtful and controls the image processing section 12 so as to read in video data of one frame from the image processing section 12 into the VRAM 134 and to store them in the video memory 131 together with the data on the date and time generated by the calendar clock 132. That is, it executes the second mode.

Figure 2:
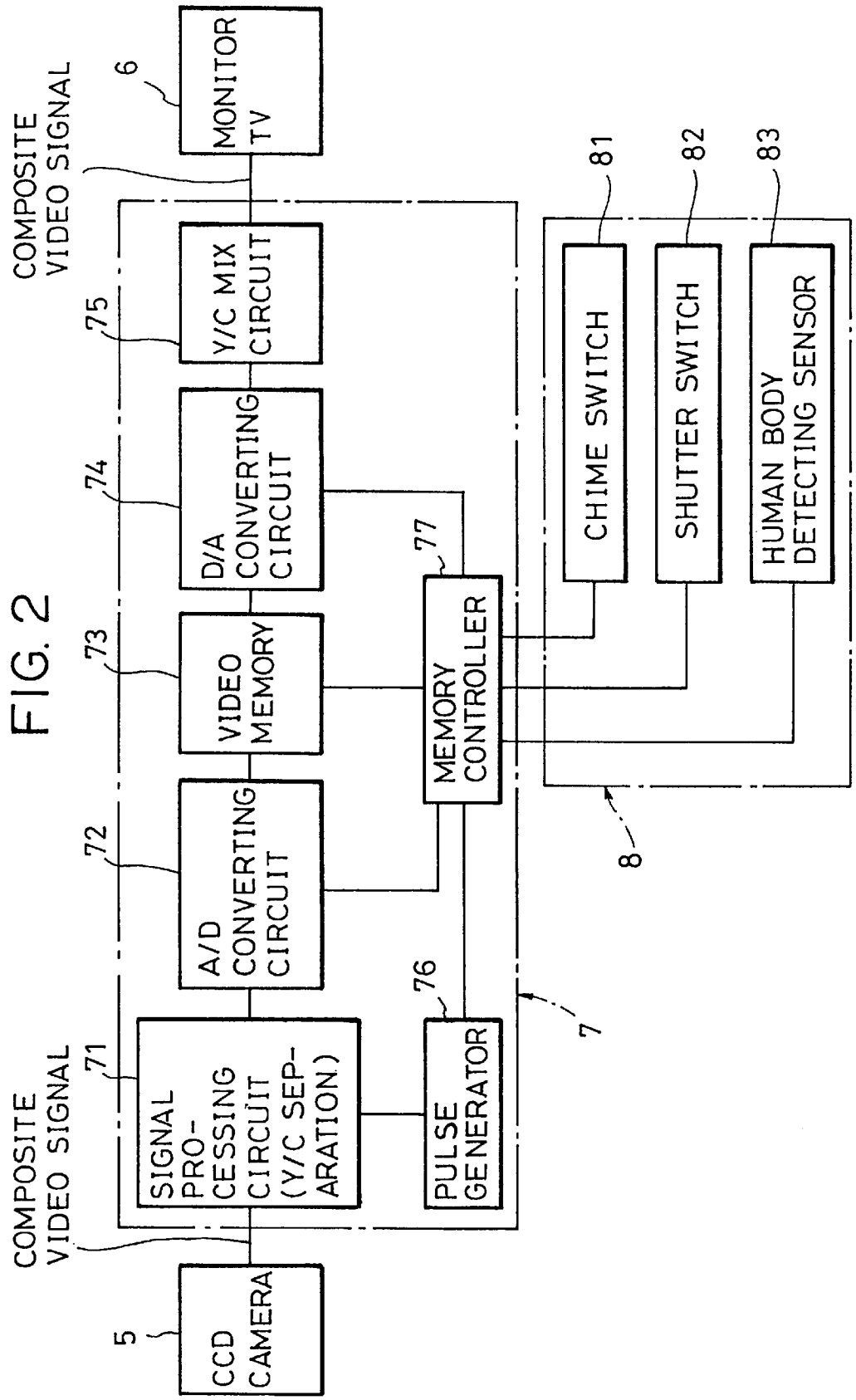
FIG. 2 is an electric block diagram showing a modified example thereof.

If an RS232C interface board, such as an RS232C interface board, is added to the door camera unit 1 indicated in the above mode of realization, it is possible to transmit video data to a near personal computer 3, a remote personal computer 4, etc. As indicated in FIG. 2, a memory processing section 7 may be connected additionally between an already existing CCD camera 5 and a monitor television 6 so that images are recorded, depending on information signals inputted from an information inputting section 8. In this case, the memory processing section 7 is composed of a signal processing circuit 71, an A/D converting circuit 72, a video memory 73, a D/A converting circuit 74, a Y/C Mix circuit 75, a pulse generator 76 and a memory controller 77. Further, the information inputting section 8 is composed of a chime switch 81, a shutter switch 82 and a human body detecting sensor 83.

According to the present invention, a door camera unit, whose imaging direction is directed to a neighborhood of a building having a video memory, is provided, in which an information inputting section is connected with the door camera unit, outputting information signals for judging whether video signal should be recorded or not. The door camera unit comprises further the video memory for recording every time an information signal inputted from the information inputting section to the door camera unit meets video recording execution conditions allowing only necessary video to be recorded automatically so that video images can be searched in a short time. Further, it is advantageous in the embodiment of the present invention where the door camera unit and recording means are assembled in one body in a compact manner.

Since the information inputting section includes a chime switch operated by a visitor and a video signal is recorded in the video memory every time an operation signal inputted from the information inputting section to the door camera unit meets video recording execution conditions, a video image of the visitor can be recorded automatically.

Further, since the information inputting section includes a chime switch operated by a visitor and a human body detecting sensor detecting access of the visitor and a video signal is recorded in the video memory unless an operation signal is inputted from the chime switch in a predetermined period of time after a detection signal has been inputted from the human body detecting sensor, a video image of a person regarded as doubtful can be recorded automatically.

Having fully described the preferred embodiments of the invention, variations and modifications may be employed without departing from the scope of the present invention. Accordingly, the following claims should be studied to learn the true scope of the present invention.

What is claimed is:

1. In combination, a door camera unit and an information inputting section, said door camera unit comprising:
   a video camera for receiving video signals;
   a video memory for storing said video signals;
   a controller for recording said video signals into said video memory; and
   means for recording a video image from said video signals in said video memory every time an information signal inputted from said information inputting section to said controller meets video recording execution conditions; and
   said information inputting section comprising a chime switch operated by a visitor and a human body detecting sensor for detecting access of said visitor;
   wherein said video recording execution conditions include recording said video signal in said video memory unless an operation signal is inputted to said controller from said chime switch in a predetermined period of time after a detection signal has been inputted to said controller from said human body detecting sensor.

2. The combination according to claim 1, wherein an imaging direction of said video camera is directed to a neighborhood of an entrance of a building.

* * * * *